Dec. 26, 1967 D. L. PLATUS ET AL 3,360,081
ENERGY ABSORBING DEVICE
Filed Sept. 23, 1966 3 Sheets-Sheet 1

DAVID L. PLATUS
FRANK A. MAROVICH
PATRICK J. CUNNINGHAM
INVENTORS

BY Heyig, Walsh & Blackham
ATTORNEYS

Dec. 26, 1967  D. L. PLATUS ET AL  3,360,081
ENERGY ABSORBING DEVICE
Filed Sept. 23, 1966  3 Sheets-Sheet 2

DAVID L. PLATUS
FRANK A. MAROVICH
PATRICK J. CUNNINGHAM
INVENTORS

BY Herzig, Walsh & Blackham
ATTORNEYS

DAVID L. PLATUS
FRANK A. MAROVICH
PATRICK J. CUNNINGHAM
INVENTORS

BY Herzig, Walsh & Blackham
ATTORNEYS

United States Patent Office 3,360,081
Patented Dec. 26, 1967

3,360,081
ENERGY ABSORBING DEVICE
David L. Platus, Covina, Frank A. Marovich, Hacienda Heights, and Patrick J. Cunningham, Fullerton, Calif.; said Marovich assignor to Ara, Inc. (Aerospace Research Associates), West Covina, Calif., a corporation of California
Filed Sept. 23, 1966, Ser. No. 581,625
8 Claims. (Cl. 188—1)

ABSTRACT OF THE DISCLOSURE

An energy absorbing body and means for twisting it in torsion, alternately and cyclically in opposite directions in response to unidirectional movement of an impact member, sufficiently to produce plastic deformation.

In general the present invention relates to a light-weight, high-energy absorbing device of the type disclosed in applicants' Patent No. 3,231,049. More particularly, the present invention relates to an energy absorbing device adapted to absorb unidirectional mechanical energy by the cyclic plastic deformation of a solid material. As used in the present application, the term "mechanical energy" may be defined according to its conventional definition, i.e., a force acting through a distance. Thus the term "mechanical energy" includes not only the kinetic energy associated with a moving body, but also the energy associated with situations, such as relieving the overload on a structure without damage to the structure. Also, as used in the present application, the term "cyclic plastic deformation" refers to the deformation of any solid material around a hysteresis curve, as illustrated in FIG. 7 discussed below, wherein a substantial amount of energy is absorbed during the course of one cycle.

At present, there are a wide variety of energy absorbing devices known which are adapted to cushion the impact of the thing being protected when it is required to bring it to a sudden stop. A common example of such energy absorbing devices are conventional hydraulic-mechanical devices, such as dashpots. However, such conventional hydraulic-mechanical energy absorbing devices are capable of absorbing relatively limited amounts of energy during a single impact and are relatively heavy, bulky devices. For example, a typical hydraulic-mechanical device now on the market has the capacity of absorbing 1,000 foot pounds of energy per pound of weight during a single impact. Because of the low capacity and high weight of such conventional hydraulic-mechanical devices, energy absorbing devices have been developed which achieve very high specific energy absorption, i.e., large values of foot pounds of energy absorbed per pound of weight of the device, but such devices usually require their substantial destruction during the course of a single impact. The most efficient such single impact energy absorption device now known is probably the frangible tube device having a specific energy absorption of about 30,000 foot pounds per pound, although similar devices, such as crushable materials and gas-filled collapsible shells are known. However, such single impact devices have only very limited usefulness because they require replacement after usually one use and thus are not suitable in any situation which would require several impacts.

In general, therefore, an object of the present invention is a light-weight, high-energy absorbing device which may be utilized to cushion a substantial number of impacts.

Another object of the present invention is an energy absorbing device adapted to absorb unidirectional mechanical energy by cyclic plastic deformation of solid materials.

Still another object of the present invention is an energy absorbing device wherein the cyclic plastic deformation includes substantially tension deformation and compression deformation or substantially torsion deformation and reverse torsion deformation or a combination of such deformations.

Other objects and advantages of the present invention will be readily apparent from the following description and drawings which will illustrate at least one preferred exemplary embodiment of the present invention.

In general, the present invention involves an energy absorbing device which comprises an energy absorbing means and an energy transmitting means for imposing on such energy absorbing means a deformation and its reverse deformation in response to mechanical energy applied thereto. Operatively associated with both of said means is a cycling means for converting unidirectional mechanical energy applied to said energy transmitting means into cyclic plastic deformation and its reverse deformation of said energy absorbing means. At least two of said means may be combined into a single means for performing all of the functions of each of said means being combined.

In order to facilitate understanding of the present invention, reference will now be made to the appended drawings of a preferred specific embodiment of the present invention. Such drawings should not be construed as limiting the invention which is properly set forth in the appended claims.

In the drawings:

FIGURE 2 is a cross-sectional view of FIG. 1 taken along the lines 2—2 of FIG. 1, while

Figure 1:
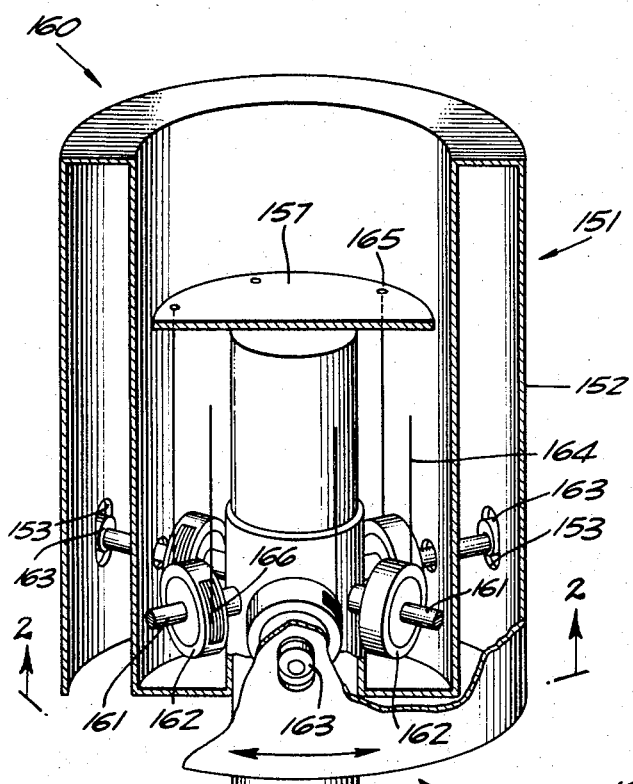
FIGURE 1 is a perspective view partially broken away of an apparatus incorporating a specific embodiment of the energy absorbing device of the present invention.
Figure 2B:
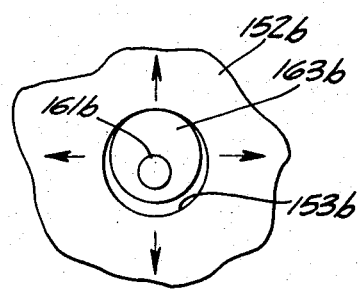
FIG. 2b shows an alternate embodiment of a portion of the device illustrated in FIG. 1.
Figure 2:
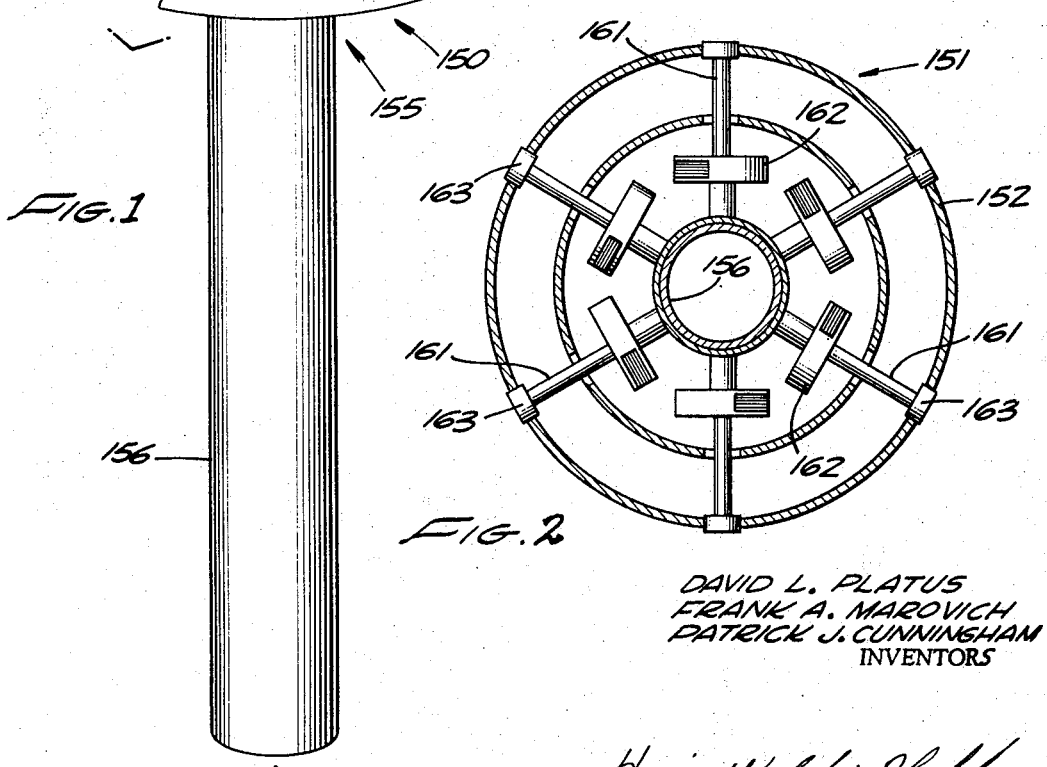

One embodiment of the present invention is illustrated in FIGS. 1 and 2 with an alternate embodiment of a portion of the device illustrated in FIG. 2b. As illustrated, the energy absorbing device 150 includes an energy absorbing means 151 and an energy transmitting means 155 for imposing on said energy absorbing means substantial tension deformation and compression deformation or torsion deformation and reverse torsion deformation or a combination of said deformations in response to mechanical energy applied thereto. A cycling means 160 converts unidirectional mechanical energy applied to the energy transmitting means 155 into cyclic plastic deformation of the energy absorbing means 151.

The energy absorbing means 151 comprises at least one shaft 152. The energy transmitting means comprises a column 156 substantially parallel and adjacent to the shaft 152. As illustrated, shaft 152 consists of a tube with the column 156 coaxially mounted therein. The cycling means 160 comprises a series of rods 161 rotatably mounted between the shaft 152 and the column 156. Each of the rods 161 has a spool 162 and a cam 163 coaxially mounted thereon. The cycling means 160 also includes cords 164 having their first end 165 attached to the free end 157 of the column 156 and having their second end 166 wound around the spool 162. The cam 163 is rotatably mounted in an elongated slot 153 which is provided in the shaft 152 with the major axis of slot 153 lying parallel to the major axis of the shaft 152. As illustrated in FIG. 1, the slots 153 and cam 163 are adapted to impose on the shaft 152 cyclic plastic torsion deformation and reverse torsion deformation by the rotation of the cam 163 in the slot 153. However, as illustrated in FIG. 2b, by utilizing a substantially circular slot 153b both cyclic plastic tension deformation and compression deformation and torsion deformation and reverse torsion deformation are produced by the rotation of the cam 163b in the slot 153b.

Figure 3:
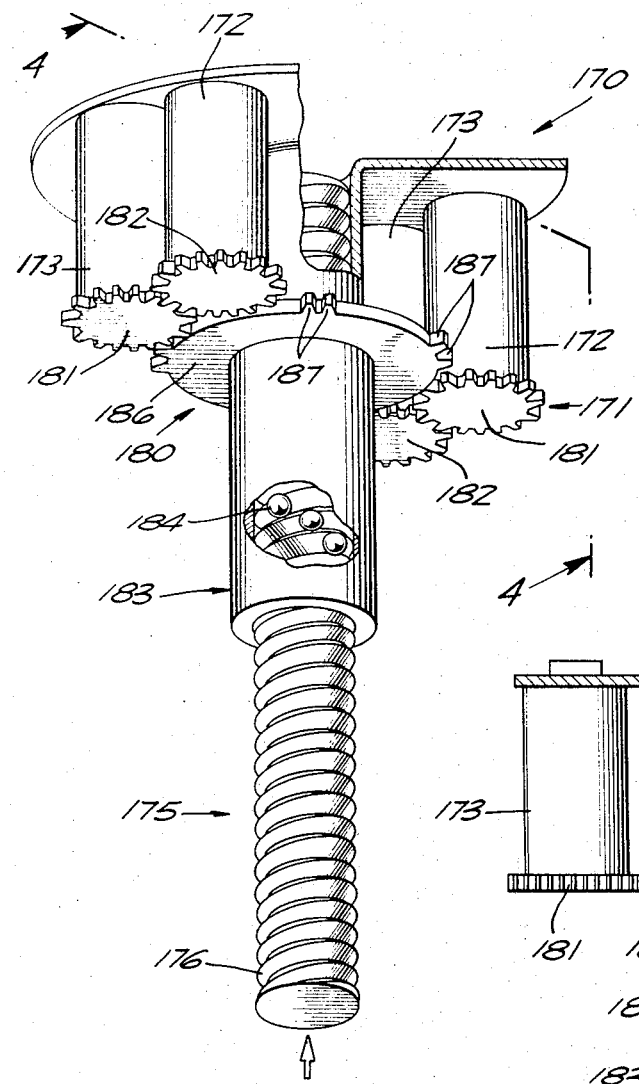
FIGURE 3 is a perspective view partially broken away of another embodiment of the present invention.
Figure 4:
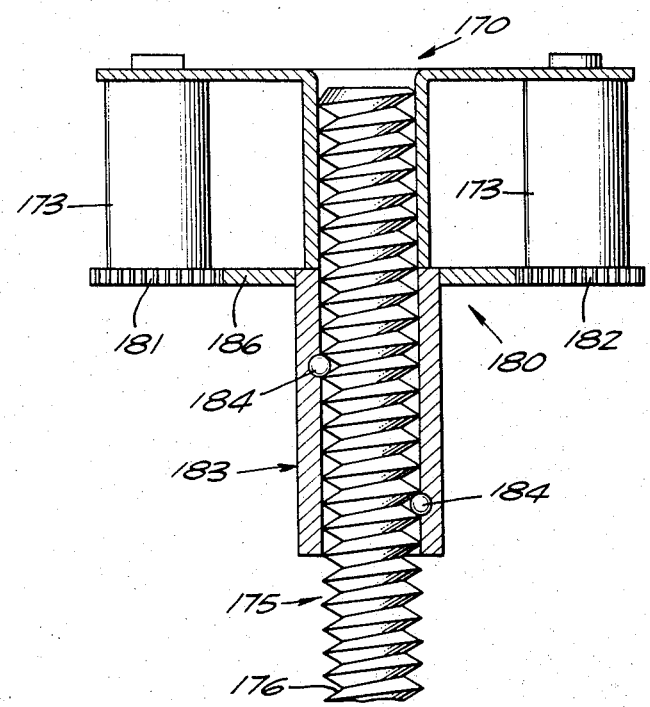
FIGURE 4 is a cross-sectional view of FIG. 3 taken along the lines 4—4 of FIG. 3.

Another embodiment of the present invention is illustrated in FIGS. 3 and 4. In FIGS. 3 and 4, the energy absorbing device 170 includes an energy absorbing means 171 comprising a series of pairs of shafts 172 and 173 with each pair of shafts 172 and 173 mounted substantially parallel and adjacent to each other. The energy transmitting means 175 comprises a screw threaded column 176 mounted substantially parallel and adjacent to the pairs of shafts 172 and 173. The cycling means 180 comprises pinion gears 181 and 182 coaxially mounted on the shafts 172 and 173, respectively, with said pinion gears being mutually engaged. Rotatably mounted on and engaged with the column 176 is a nut 183 which is engaged with the column 176 by means of a set of ball bearings 184. Coaxially mounted on the nut 183 is a skip tooth gear 186 which is adapted to be engaged in series with the pinion gears 181 and 182. The pinion gears 181 and 182 and the skip tooth gear 186 are adapted to impose on the shafts 172 and 173 cyclic plastic torsion deformation and reverse torsion deformation by the rotation of the nut 183 on the column 176. Such cycling is achieved by having spaced sets of teeth 187 on the skip tooth gear 186 engage first the pinion gear 181 during the clockwise rotation of the skip tooth gear 186. Such engagement causes the pinion gear 181 to rotate in a counterclockwise direction and the mutually engaged pinion gear 182 to rotate in a clockwise direction. When the teeth 187 on the skip tooth gear 186 leave the pinion gear 181 and engage the pinion gear 182, then the rotation of the pinion gear 182 is reversed to rotate in a counterclockwise direction and the pinion gear 181 is also reversed and rotates in a clockwise direction. Thus, during each movement a set of teeth 187 pass a pair of pinion gears 181 and 182 and a cycle of torsion deformation and reverse torsion deformation on the shafts 172 and 173 is accomplished.

Figure 5:
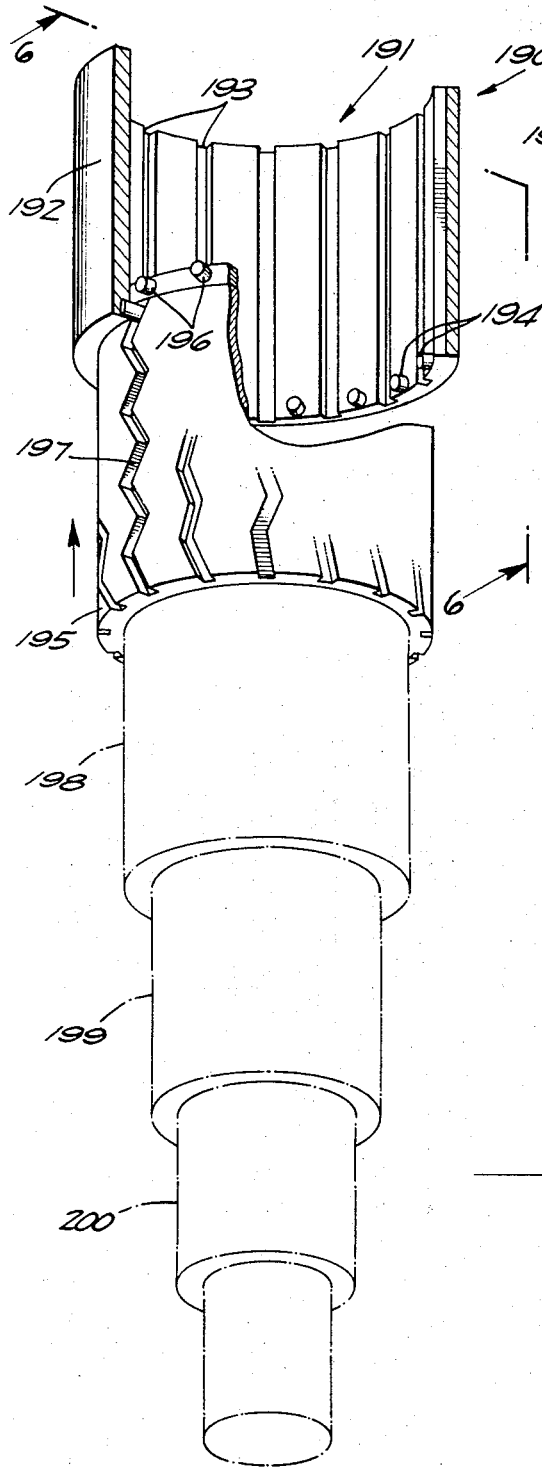
FIGURE 5 is a perspective view partially broken away of still another embodiment of the present invention.
Figure 6:
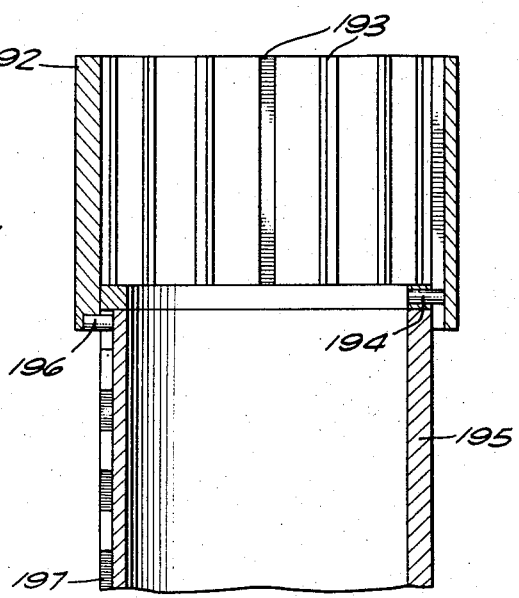
FIGURE 6 is a cross-sectional view of FIG. 5 taken along the lines 6—6 of FIG. 5.

Another embodiment of the present invention is illustrated in FIGS. 5 and 6. In FIGS. 5 and 6, the energy absorbing device 190 combines the cycling, energy absorbing and energy transmitting means in a single structure 191. Such structure comprises at least a first tube 192 having a series of internal, substantially parallel longitudinal grooves 193 spaced around its circumference and a series of inwardly projecting lugs 194 spaced around its circumference. A second tube 195 is coaxially mounted at least partially within the first tube 192. The second tube 195 has a series of externally projecting pins 196 spaced around its circumference corresponding to the first tube internal grooves 193 with the pins 196 being slidably received in the first tube internal grooves 193. Also, the second tube 195 has a series of external longitudinal grooves 197 spaced around the circumference corresponding to the first tube lugs 194, and said first tube lugs 194 are slidably received in the second tube external grooves 197. The second tube external grooves 197 form a zigzag pattern which is adapted to impose on the first and second tubes 192 and 195 cyclic plastic torsion deformation and reverse torsion deformation by the insertion of the second tube 195 into the first tube 192. A series of additional tubes 198, 199 and 200 are telescopically received in each other and the first and second tubes 192 and 195 in a similar fashion so that the whole series of tubes is alternately subjected to torsion deformation and reverse torsion deformation when the telescope is collapsed.

Figure 7:
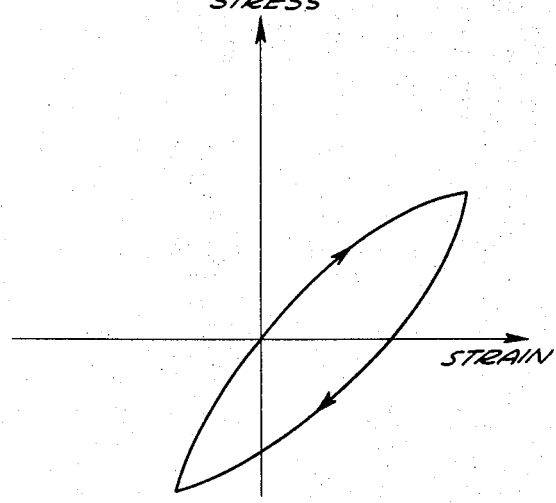
FIGURE 7 is a graphical sketch illustrating the basic principle of the present invention.

As set forth above, the energy absorbtion device of the present invention includes an energy absorbing means which is subjected to cyclic plastic deformation and reverse deformation. Thus, any deformable solid material which exhibits a hysteresis curve, as illustrated in FIG. 7, may be utilized in the present invention. In FIG. 7 the area enclosed within the hysteresis curve loop represents the energy absorbed during the course of one cycle of cyclic plastic deformation. The materials which may be used in the present invention include not only metals, such as steel, copper, titanium, brass, etc. but also non-metals, such as plastics, natural and synthetic rubbers and elastomers of various kinds, such as polyurethane elastomers.

Many other specific embodiments of the present invention will be obvious to one skilled in the art in view of this disclosure. For example, the energy absorbing means may utilize a tube structure, but a rod structure may be preferred since it includes increases of the weight of working material which can be utilized in a given space. Similarly, a variety of energy transmitting means and cycling means may be utilized.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are to be considered part of the present invention.

What is claimed is:

1. A lightweight, high-energy absorbing device adapted to absorb unidirectional mechanical energy by cyclic plastic deformation comprising:
   (a) an energy absorbing means adapted to be subjected to plastic torsion deformation and reverse torsion deformation;
   (b) an energy transmitting means for cyclically and reversely imposing twisting deformation on said energy absorbing means to sequentially produce torsion deformation and reverse torsion deformation in response to unidirectional mechanical energy applied to said transmitting means; and
   (c) a cycling means actuated by said transmitting means for converting unidirectional mechanical energy applied to said energy transmitting means into cyclic plastic substantially torsion deformation and reverse torsion deformation of said energy absorbing means.

2. A device as stated in claim 1 wherein:
   (a) said energy absorbing means comprises at least one shaft means;
   (b) said energy transmitting means comprises column means operatively associated with said shaft means; and
   (c) said cycling means comprises:
      (I) cam means rotatably mounted between said shaft means and said column means,
      (II) connecting means connecting said cam means to said column means for rotating said cam means during energy absorbing operations, and
      (III) means in said shaft means cooperating with said cam means being adapted to impose on said shaft means cyclic plastic torsion deformation and reverse torsion deformation by the rotation of said cam means in said cooperating means.

3. A device as stated in claim 1 wherein:
   (a) said energy absorbing means comprises at least one tube;

(b) said energy transmitting means comprises a column mounted substantially coaxially with respect to said tube;
(c) said cycling means comprising:
(I) at least one rod rotatably mounted between said tube and column, said rod having a spool and a cam coaxially mounted thereon,
(II) a cord having its first end attached to said column and its second end wound around said spool, and
(III) a slot in said tube with said cam rotatably mounted therein, said slot and cam being adapted to impose on said tube cyclic plastic torsion deformation and reverse torsion deformation by the rotation of said cam in said slot.

4. A device as stated in claim 1 wherein:
(a) said energy absorbing means comprises shaft means;
(b) said energy transmitting means comprises column means mounted substantially parallel and adjacent to said shaft means; and
(c) said cycling means comprises:
(I) first gear means operatively associated with said shaft means for subjecting said shaft means to plastic torsion deformation when said gear means is rotated, and
(II) second gear means operatively associated with said column means and said first gear means for subjecting said first gear means to rotation and reverse rotation when said second gear means is actuated by said column means for imposing on said shaft means cyclic plastic torsion deformation and reverse torsion deformation by the rotation gear means.

5. A device as stated in claim 1, wherein said energy absorbing means, said cycling means and said energy transmitting means form a combination comprising:
(a) first tube means having an encompassing sidewall having an inner circumference and an outer circumference;
(b) second tube means telescopically associated with said first tube means, and second tube means having an encompassing sidewall including an inner circumference and an outer circumference;
first means connecting a first portion of one of said sidewalls to the other of said sidewalls for restraining rotation of said first portion while leaving said tube means free to move axially with respect to each other and while leaving the remaining portion of said one sidewall free to be subjected to torsion deformation and reverse torsion deformation; and
second means connecting said other sidewall to said remaining portion of said one sidewall for subjecting said remaining portion to cyclic plastic torsion deformation and reverse torsion deformation during axial movement of said tube means with respect to each other.

6. A device as stated in claim 1, wherein:
(a) said energy absorbing means comprises at least two shafts mounted substantially parallel and adjacent to each other;
(b) said energy transmitting means comprises a screw-threaded column mounted substantially parallel and adjacent to said shafts; and
(c) said cycling means comprises:
(I) pinion gears coaxially mounted on said shafts, said pinion gears being mutually engaged,
(II) a nut rotatably mounted on and engaged with said column, and
(III) a skip tooth gear coaxially mounted on said nut and adapted to be engaged sequentially with said pinion gears, said pinion gears and skip tooth gear being adapted to impose on said shafts cyclic plastic torsion deformation and reverse torsion deformation by the rotation of said nut on said column.

7. A device as stated in claim 1 wherein said cycling, energy absorbing and transmitting means comprise:
(a) at least a first tube, said tube having
(I) a series of internal, substantially parallel longitudinal grooves spaced around its circumference, and
(II) a series of inwardly projecting lugs spaced around its circumference; and
(b) a second tube coaxially mounted at least partially within said first tube, said second tube having
(I) a series of externally projecting pins spaced around its circumference corresponding to said first tube internal grooves, said pins being slidably received in said first tube internal grooves, and
(II) a series of external longitudinal grooves spaced around its circumference corresponding to said first tube lugs, said first tube lugs being slidably received in said second tube external grooves and said lugs and grooves being adapted to impose on said tubes cyclic plastic torsion deformation and reverse torsion deformation by the insertion of said second tube in said first tube.

8. A device as stated in claim 7 wherein said nut is engaged with said column by means of a set of ball bearings.

References Cited

UNITED STATES PATENTS 3,031,034    4/1964    Thomas   ------------ 188—129

DUANE A. REGER, *Primary Examiner.*